United States Patent [19]

Hougard

[11] Patent Number: 4,735,016
[45] Date of Patent: Apr. 5, 1988

[54] FLOWER POT
[75] Inventor: Erling Hougard, Jyllinge, Denmark
[73] Assignee: Os Plastic A/S, Farum, Denmark
[21] Appl. No.: 763,841
[22] PCT Filed: Dec. 9, 1983
[86] PCT No.: PCT/DK83/00119
 § 371 Date: Jul. 26, 1985
 § 102(e) Date: Jul. 26, 1985
[87] PCT Pub. No.: WO85/02517
 PCT Pub. Date: Jun. 20, 1985
[51] Int. Cl.$^4$ ............................................. A01G 27/00
[52] U.S. Cl. ................................................... 47/80
[58] Field of Search .............. 47/59, 62, 63, 71, 79–81

[56] References Cited

U.S. PATENT DOCUMENTS

| | | | |
|---|---|---|---|
| 1,221,449 | 4/1917 | Hitchcock | 47/80 |
| 1,251,552 | 1/1918 | Marks | 47/80 |
| 1,977,827 | 10/1934 | Kneller | 47/81 |
| 2,055,844 | 9/1936 | Kneller | 47/79 |
| 2,713,752 | 7/1955 | Sobol | 47/80 |
| 3,381,410 | 5/1968 | Potain | 47/79 |
| 3,552,058 | 1/1971 | Fici | 47/79 |
| 3,576,088 | 4/1971 | Arca | 47/81 |
| 3,975,860 | 8/1976 | Harned et al. | 47/81 |
| 4,171,593 | 10/1979 | Bigglestone | 47/79 |
| 4,198,784 | 4/1980 | Sukert | 47/79 |
| 4,270,309 | 6/1981 | Baumann | 47/79 |

FOREIGN PATENT DOCUMENTS

| | | | |
|---|---|---|---|
| 157983 | 2/1940 | Fed. Rep. of Germany | 47/79 |
| 2433036 | 1/1976 | Fed. Rep. of Germany | 47/80 |
| 7414433 | 5/1975 | Netherlands | 47/79 |
| 128773 | 7/1950 | Sweden | 47/80 |
| 12057 | of 1896 | United Kingdom | 47/81 |
| 15061 | of 1902 | United Kingdom | 47/79 |

Primary Examiner—James R. Feyrer
Attorney, Agent, or Firm—Pennie & Edmonds

[57] ABSTRACT

A flower pot for plants, especially flowers, comprising a container portion (10), and a partitioning member accommodated at the low part of the container. They define a bottom chamber (18) for collecting water. The bottom chamber (18) is provided with a liquid overflow (16) at the proper position on the bottom wall of the container. Some overflow apertures are also provided around an inwardly extending shoulder on the lower side wall of the container, with a position higher than the overflow. The partitioning member comprising a sunk park (28) extending downwardly into the bottom chamber (18) past the niveau of the overflow (16). The sunk part (28) at its lower end defines a passage opening (42) towards the chamber (18), and at its upper end is open for receiving filling, e.g. earth. The filling put into the sunk part may serve as a wick for sucking up water from the bottom chamber.

4 Claims, 1 Drawing Sheet

FLOWER POT

FIELD OF THE INVENTION

The invention concerns a flower pot comprising a container portion, the lower part of which being adapted to receive a bottom insert which defines a bottom chamber for collecting water together with the bottom wall of said container part, said bottom chamber being provided with a liquid overflow, and said bottom insert constituting the upper limitation, and said bottom wall constituting the lower limitation of said chamber.

Said bottom chamber shall not only serve as a collecting means for surplus water, e.g. as a result of daily watering the plant, but shall also be able to receive a water supply which the plant can drain, so that it would be enough with watering fewer times.

BACKGROUND OF THE INVENTION

Known flower pots of said kind are formed in such a way that the filling of the flower pot, e.g. earth gets into contact with water collected in said bottom chamber at points distributed over the total area of the bottom. This can result in moistening the lowermost layer of said filling too much, so that said layer becomes sour.

SUMMARY OF THE INVENTION

It is the object of the invention to indicate a flower pot by means of which said disadvantage can be avoided.

The invention is characterized in, that said bottom insert comprises a sunk part extending downwardly into said bottom chamber past the niveau of said overflow, said sunk part at its lower end comprising a passage opening towards said chamber, and at its upper end being open for receiving filling, e.g. earth.

Filling filled into said sunk part may thus serve as a wick which sucks water up from said bottom chamber for distributing it to the remaining filling. The dimensions of said sunk part, and consequently the quantity of filling used for filling said sunk part can be limited so much that in practice there will be no danger for the filling becoming sour. Since it is not necessary to shape the remaining part of said bottom insert with respect to receive water from said bottom chamber, the bottom insert may be shaped in such a way that said remaining part will be positioned considerably higher than the niveau of said overflow. Thus, in said bottom chamber, a satisfactory large space can be maintained between the maximum liquid level and said bottom insert for maintaining a cushion of air.

According to the invention, said sunk part of said bottom insert may be shaped like a groove extending along the periphery of said bottom insert. Said groove embodiment may secure an adequate distribution of the water sucked up in the filling, and moreover contribute to a stiffening of said bottom insert.

According to the invention a limiting wall of said sunk part may provide a space together with the lowermost part of the wall of the container portion, said space being in open communication with said bottom chamber, and said space may be provided with overflow openings at its upper part, said openings being positioned higher than said overflow of said bottom chamber. This embodiment results in the specific advantage, that surplus water will be poured off in case said flower pot is tilting and the main overflow, which is normally positioned at the center area of the container part bottom, is not able to operate because of said tilting. A flower pot, which has been planted up, and the bottom chamber of which has been filled with water, may thus be emptied totally of water, e.g., when having to be transported after having been sold.

An embodiment considering all the features which are characteristic for the present invention, is characterized in that said sunk part of the bottom insert is shaped as a circumferential groove, which is adapted at its bottom to rest on said bottom wall by means of spacing elements, and which is surrounded by an outwardly extending flange at its top, which extends both towards the side wall of the container portion when said bottom insert is inserted into said container portion, and in a distance of height above an inwardly extending shoulder on said container side wall, the distance of height of said shoulder from said bottom wall of the container portion being larger than the distance of height of said overflow of the bottom chamber from said bottom wall, said shoulder being provided with overflow apertures.

Such a bottom insert may be readily manufactured by means of die casting. It is well stiffened in itself, and it allows to maintain a traditional positioning of the overflow in the center of the container bottom wall, so that this overflow with an adequate shape may also serve as a support for the center area of the top wall of the insert. The peripheral flange centers the insert in said container portion and provides simultaneously a shield above the apertures in said shoulder, thus avoiding these apertures to be clogged by container portion filling. Said shield prevents also water supplied from above to flow directly out through said overflow apertures in said shoulder.

DETAILED DESCRIPTION OF THE INVENTION

Figure 1:
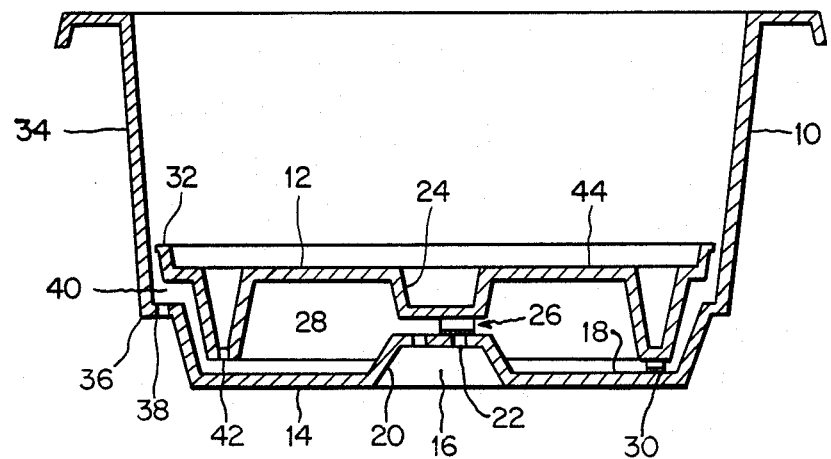

The invention will be described in the following with reference to the drawing showing schematically a cross-section through a flower pot according to the invention, including a bottom insert.

The flower pot shown comprises a container portion 10, the lower part of which being adapted to receive a bottom insert 12, which defines a bottom chamber 18 together with the bottom wall 14 of said container part for collecting water, said bottom chamber 18 being provided with a liquid overflow 16, the bottom insert 12 constituting the upper limitation, and the bottom wall 14 constituting the lower limitation of said chamber.

In the embodiment shown, said overflow 16 is defined by a central elevation 20 of the bottom of the container portion. In the top wall thereof, said elevation is provided with a number of apertures 22. The bottom insert 12 is provided with a central depression 24, the lower part of which resting on the top of the elevation 20 by means of spacing elements 26.

Moreover, said bottom insert 12 is provided with a sunk part 28 shaped as a circumferential groove extending along the periphery of the bottom insert 12, said groove being adapted to rest upon the bottom wall 14 by means of lower spacing ribs 30. At its upper end the insert is surrounded by an outwardly extending marginal flange 32, which extends both towards the side wall 34 of the container portion, when said bottom insert 12 is inserted into said container portion 10, and in a distance of height above an inwardly extending shoulder 36 on the container side wall 34, the distance of height of said shoulder 36 from the bottom wall 14 of the container portion being larger than the distance of height of the overflow 16 of the bottom chamber from said bottom wall 14, said shoulder 36 being provided with overflow apertures 38. Thus, the outer surface of the sunk, groove-shaped part 28 defines a space 40 together with the opposite part of the container side wall, said space 40 constituting an open connection between said bottom chamber 18 and the overflow apertures 38, which preferably are positioned regularly distributed along the circumference of said container.

In the embodiment shown, the container 10, and thus the insert 12 are generally formed circular cylindrical.

At its lower end, the depressed, groove-formed part 28 is provided with apertures 42. Also these apertures are preferably positioned regularly distributed along the circumference of said container.

When the container 10 is filled, e.g. with earth, and the bottom chamber 18 is filled with water, the earth filling put into the groove 28 will be able to suck water through the apertures 42 and thus serve as a wick, which keeps the filling sufficiently wet. At the top, the flange 32 provides a shield over the space defined by the outer wall of the groove 28 and the opposite part of the container wall, so that said filling cannot push itself down and clogg the apertures 38, and the apertures 38 may serve as an overflow, when the container is in a tilted position. Moreover, said shield prevents water supplied from above to discharge directly through said apertures 38.

The bottom insert is provided with a top wall 44 which is positioned at such a height that it is positioned at a level above the overflow apertures 38, when the bottom insert 12 is inserted in the container portion 10. In this way, an air cushion of considerable seize may always be maintained above the water level.

I claim:

1. A plant container comprising a container defined by a side wall and a bottom wall integrally formed with said side wall, and a partitioning member, said partitioning member fitting within said side wall and above said bottom wall to define a bottom chamber for collecting water, said bottom wall being provided with an upstanding liquid overflow, said overflow defining a niveau at a selected height above said bottom wall, and wherein said partitioning member includes a sunken hollow portion extending downwardly into said bottom chamber, said sunken hollow portion having a lower end, said lower end having a passage communicating the interior of said sunken hollow portion with said bottom chamber, said sunken hollow portion being open at the top thereof for receiving root media, said sunken hollow portion extending below said niveau of said liquid overflow, said sunken hollow portion including a wall which is spaced from and lies within said side wall to define a space, said space being in fluid communication with said bottom chamber, said side wall including side wall overflow apertures which communicate said space with the exterior of said plant container, and said side wall apertures being spaced above the niveau of said upstanding liquid overflow.

2. The plant container as defined in claim 1 further characterized in that said upstanding liquid overflow is centrally located in said bottom wall, said sunken hollow portion is in the shape of a circumferential groove extending inwardly of the periphery of said partitioning member, said groove being surrounded by a flange extending outwardly from the top outward periphery of said groove and toward said side wall, the side wall including a horizontal, inwardly extending shoulder spaced above said bottom wall, the outwardly extending flange being spaced above said shoulder.

3. The plant container as defined in claim 1 or claim 2, further characterized in that said partitioning member includes a top wall, said top wall lying at a level above said side wall overflow apertures.

4. The plant container as defined in claim 1, further characterized in that said shoulder is spaced above said bottom wall at a distance, said distance exceeding the distance between said niveau and said bottom wall, said side wall overflow apertures extending through the inward extent of said inwardly extending shoulder.

* * * * *